United States Patent [19]

Dick et al.

[11] Patent Number: 4,732,586
[45] Date of Patent: Mar. 22, 1988

[54] ASYMMETRIC OR COMPOSITE POLYQUINOXALINE BASE MEMBRANES, POSSIBLE APPLICATION TO GASEOUS PERMEATION AND MORE PARTICULARLY GASEOUS MIXTURE FRACTIONATION, AND MAINLY DEHYDRATION AND DEACIDIFICATION OF GASES, ESPECIALLY GASEOUS HYDROCARBONS

[76] Inventors: Richard Dick, 2, rue Nicolas Houël, 75005 Paris; André Le Jeune, 1, rue du 14 Juillet, 28000 Mainvilliers; François Fournie, 37, rue La Quintinie, 75015 Paris, all of France

[21] Appl. No.: 827,599

[22] Filed: Feb. 10, 1986

[30] Foreign Application Priority Data

Feb. 11, 1985 [FR] France ............................. 85 01879

[51] Int. Cl.$^4$ ............................................ B01D 53/22
[52] U.S. Cl. ............................................ 55/158; 55/16; 55/29; 55/68; 210/500.23; 210/500.28
[58] Field of Search ........................ 55/16, 29, 68, 158; 210/500.22, 500.23, 500.28

[56] References Cited

U.S. PATENT DOCUMENTS

| | | | |
|---|---|---|---|
| 3,980,456 | 9/1976 | Browall | 55/158 |
| 4,113,628 | 9/1978 | Alegranti | 210/500.23 |
| 4,159,251 | 6/1979 | Wrasidlo et al. | 210/500.28 X |
| 4,214,020 | 7/1980 | Ward et al. | 55/158 X |
| 4,364,759 | 12/1982 | Brooks et al. | 55/158 X |
| 4,529,793 | 7/1985 | Abe et al. | 210/500.28 X |
| 4,533,369 | 8/1985 | Okita | 55/158 |
| 4,576,721 | 3/1986 | McCreedy et al. | 210/500.28 X |

FOREIGN PATENT DOCUMENTS 1180235 1/1985 Canada ........................ 210/500.28

*Primary Examiner*—Robert Spitzer

[57] ABSTRACT

The present invention relates to an asymmetric gaseous permeation membrane, also applicable to fractionation of a gaseous mixture and in particular dehydration and deacidification of gases, in particular gaseous hydrocarbons, and obtained from polymers of the polyquinoxaline family presenting the unit:

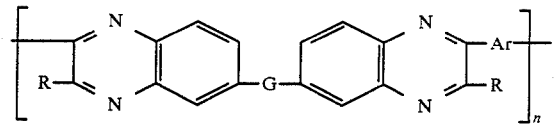

with: $n \geq 10$ and
R = H or phenyl radical
G = carbon-carbon bond, or —O—, —S—, —SO$_2$—, —CO—

Ar = 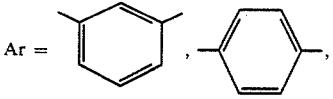 ,

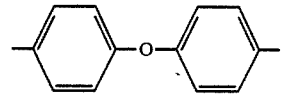

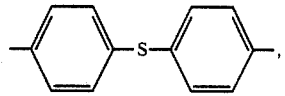

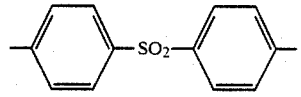

presenting a dense "skin" of low thickness of 0.05 to a few microns substantially without defects to permit gas molecules to pass through by a dissolution-diffusion mechanism.

8 Claims, No Drawings

ASYMMETRIC OR COMPOSITE POLYQUINOXALINE BASE MEMBRANES, POSSIBLE APPLICATION TO GASEOUS PERMEATION AND MORE PARTICULARLY GASEOUS MIXTURE FRACTIONATION, AND MAINLY DEHYDRATION AND DEACIDIFICATION OF GASES, ESPECIALLY GASEOUS HYDROCARBONS

FIELD OF THE INVENTION

This invention relates to asymmetric or composite membranes based on polyquinoxalines, their application to gaseous permeation and more particularly fractionation of gaseous mixtures, and mainly dehydration and deacidification of gases especially gaseous hydrocarbons.

BACKGROUND OF THE INVENTION

Polyquinoxalines are prepared by polycondensation of tetraketones or biketonic dialdehydes with tetramines according to the following scheme:

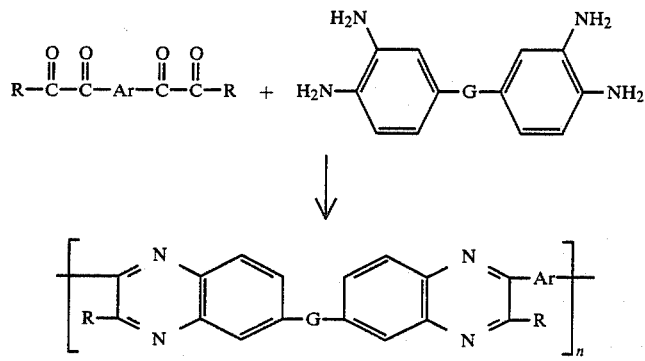

with $n \geq 10$ and
R=H or phenyl radical,
G=carbon-carbon bond or —O—, —S—, —SO$_2$—, —CO—.

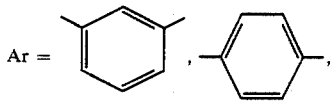

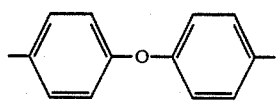

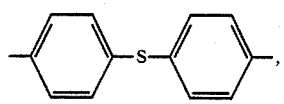

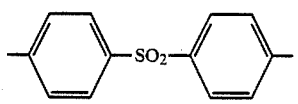

Such polycondensation is generally carried out in solution (see for example: G. de GAUDEMARIS, B. SILLION, J. PREVE, Bull. Soc. Chem. (1964) 1793—J. K. STILLE, J. R. WILLIAMSON, J. Polym. Sci. /A/ 2. 3867 (1964) and P. M. HERGENROTHER, Polymer Eng. Sci. 16 (No. 5) 303 (1976)).

The polymers of the polyquinoxaline family are characterized by good chemical and thermal stability which makes them particularly capable of resisting drastic conditions of use (oxidation, extreme pH and the like). Their solubility in certain chlorinated hydrocarbons and m-cresol permits formation of films and membranes therefrom.

Membranes such as those described in French Pat. No. 2 392 697 based on such polymers are particularly known but these are microporous membranes for ultrafiltration, such process implying separation by a simple flow-through process which has nothing to do with processes used in gaseous permeation separation. As a matter of fact, the passage of a gas through a gaseous permeation membrane occurs according to a dissolution and diffusion mechanism following Fick's laws.

Such process implies gas dissolution in the active portion of the membranous material, for example, at the upstream face of the membrane, then diffusion of the dissolved molecules of the upstream face towards the downstream face under the effect of the pressure differential between the two faces and finally evaporation of the gas molecules on the downstream face of the membrane.

Due to this, the permeability coefficient P of a gas through the membrane is defined as being the product of two coefficients: P=S. D.
S=solubility coefficient of gas in the membrane.
D=diffusion coefficient of gas in the membrane.

In order for the membrane to be able to separate two gases it is necessary that the permeability coefficients of the two gases differ from one another.

Transportation of gas according to this mechanism is different from that occurring by flowing through microporous media. The passage of a gas through a microporous membrane occurs according to KNUDSEN's law if the average free travel of the gas is higher than the pore diameter. In this case, the permeability coefficients $P_1$ and $P_2$ of two gases of molecular mass $M_1$ and $M_2$ correspond to the following ratio:

$$\frac{P_1}{P_2} = \left(\frac{M_2}{M_1}\right)^{0.5}$$

In order to have separation of the two gases it is necessary that their molecular masses be clearly different.

Thus when it is desired to efficiently separate gases of similar molecular masses, for example $CO_2$, $H_2O$ and CH4, it is necessary that the passage of such gases should not occur through a simply microporous membrane since otherwise the separation factor between such gases as taken by pairs will be according to the ratio of the square root of their molecular masses, i.e.:

$$\frac{H_2O}{CH_4} \sim \left(\frac{16}{18}\right)^{\frac{1}{2}} = 0.94$$

$$\frac{CO_2}{CH_4} \sim \left(\frac{16}{44}\right)^{\frac{1}{2}} = 0.60$$

but this is too small a separation to present any practical interest.

In order for the gaseous permeation phenomenon to occur fully it is significant for the membrane to present a dense layer on one face. By "dense" layer it is meant a layer without any pores permitting direct through-passage of the gaseous molecules by simple flowing through under the effect of pressure.

Such pores will have to be of a diameter much lower than 1 nm, preferably lower than 0.5 nm.

Since the rate of diffusion of gas molecules through such a zone is low it is desirable that the thickness of such zone should be as low as possible and represent only a fraction of the total thickness of the membrane; the other portion of the membrane preferably comprises a microporous structure zone so that the flow of gas therethrough is not slowed down.

Furthermore, as for most of the filmogenic polymers, polyquinoxalines, of a sufficiently high molecular mass, permit preparation of membranes or films having good mechanical strength. Such films or membranes, dense and of a homogeneous structure, can be prepared by pouring by means of an applicator the solution of polyquinoxaline of sufficient viscosity onto a plane carrier and by completely evaporating the solvent. To completely remove the solvent it might be useful to effect such evaporation under vacuum and at temperatures higher than 100° C. Under these conditions, films or membranes are obtained, having an average diameter of pores lower than 10 Å.

To determine permeability of this type of polymer relative to different gases the Applicants have prepared polyphenylquinoxaline films of a thickness of 10 to 20 microns by complete evaporation of the solvent.

The measurements of gaseous permeability have shown that surprisingly such films were more permeable to water vapor than to other gases. The Table 1 hereinbelow shows the values of permeabilities obtained for different gases at 20° C. and under a pressure of 3 bars (except for water vapor the permeability of which was measured at 50° C. and a relative pressure of 0.56 to 60), as well as the separation factors corresponding to gas permeability ratios. The permeabilities are expressed in units cm$^4$/cm$^2$.sec.cm. Hg representing the volume as measured in cm$^3$ having passed through a membrane of 1 cm$^2$ of useful area and 1 cm of thickness in 1 second under a pressure differential of 1 cm mercury.

The obtained values can be considered as being close to the intrinsic permeabilities of the polyphenylquinoalines since the films were prepared under experimental conditions which prevent formation of pores. Due to this, one may consider that the passage of gases through the film occurs according to a dissolution and diffusion mechanism which follows Fick's laws. Only the presence of any defects in the film might be the cause of gas passage by flowing through the pores.

The comparison of the intrinsic permeabilities of such films with those of films prepared from other polymers (Table 2 hereinbelow) show that only cellulose acetate possesses a separation factor between water vapor and methane higher than that of polyphenylquinoxaline for an equivalent CH$_4$-permeability, but on the other hand, a lower separation factor between the carbon dioxide and methane. Moreover, polyphenylquinoxaline presents much higher chemical and thermal stability than cellulose acetate. For these reasons the polymers of the polyquinoxaline family are of a special interest for separation of water vapor and carbon dioxide from gaseous hydrocarbons.

TABLE 1

Intrinsic permeabilities P and factors of separation of homogeneous films in polyphenylquinoxaline in respect to different gas.

P expressed in $\frac{cm^3 \cdot cm}{cm^2 \cdot sec \cdot cm\, Hg}$

Measurement temperature: 20° C.

| P · 10$^{10}$ | | | | | | Separation factors | | | |
|---|---|---|---|---|---|---|---|---|---|
| O$_2$ | CO$_2$ | N$_2$ | CH$_4$ | He | H$_2$O + | H$_2$O/CH$_4$ | CO$_2$/O$_2$ | CO$_2$/CH$_4$ | H$_2$O/O$_2$ |
| 1.0 | 6.0 | 0.3 | 0.3 | 7.4 | 1800 | 6000 | 6 | 20 | 1800 |

+ as measured at 50° C. and for a relative pressure of $\frac{p}{po} = 0.56$

TABLE 2

Intrinsic permeabilities and separation factors of dense films in respect to water vapor, carbon dioxide and methane.

P expressed in $\frac{cm^4}{cm^2 \cdot sec \cdot cm\, Hg}$

| Nature of film | P · 10$^{10}$ | | | Separation factor | |
|---|---|---|---|---|---|
| | CH$_4$ | CO$_2$ | H$_2$O | H$_2$O/CH$_4$ | CO$_2$/CH$_4$ |
| Poly-dimethyl-siloxane* | 590 | 3200 | 40000 | 68 | 5.4 |
| Ethyl cellulose* | 6 | 40 | 24000 | 4000 | 6.7 |
| Poly-carbonate* | 3.6 | 8 | 1400 | 389 | 2.2 |
| Vinyl poly-chloride* | 2 | 3.7 | 590 | 295 | 1.8 |
| Polysulfone | 1.7 | 4.4 | 1200 | 705 | 2.6 |
| TEFLON FEP* | 1.4 | 1.7 | 33 | 24 | 1.2 |
| Cellulose acetate* | 0.3 | 2.4 | 10000 | 33000 | 8 |
| Polyphenyl-quinoxaline | 0.3 | 6 | 1800 | 6000 | 20 |
| Polyethyl-enetere- | 0.006 | 0.15 | 175 | 29170 | 25 |

TABLE 2-continued

Intrinsic permeabilities and separation factors of dense films in respect to water vapor, carbon dioxide and methane.

$$P \text{ expressed in } \frac{cm^4}{cm^2 \cdot sec \cdot cm\ Hg}$$

| Nature of film | $P \cdot 10^{10}$ | | | Separation factor | |
|---|---|---|---|---|---|
| | $CH_4$ | $CO_2$ | $H_2O$ | $H_2O/CH_4$ | $CO_2/CH_4$ |
| phthalate | | | | | |

*Values published by W. PUSCH & A. WALCH in Angew. Chem. Int. Ed. Engl. 21 (1982) 660–685.

SUMMARY OF THE INVENTION

The Applicants, having noted the unexpected property of the polymers of such family consisting of having high permeability relative to water vapor when they are in a dense layer, have been brought to envisage the use of polymers of such family to produce gaseous permeation membranes in particular for dehydratation of gases.

The use of polymers of the polyquinoxaline family as gaseous permeation membranes is only economically profitable if such membranes have a high permeability relative to the gases to be separated from the gaseous mixture.

One can use known processes to prepare high permeability membranes.

One of such processes permits preparation of asymmetric structure membranes characterized in that one face of the membrane contains pores of low dimensions (50 to 1000 Å), whereas the opposite face contains pores of much higher dimensions, that may reach a few microns. This process was used in particular in case of the cellulosic polymers and is described as a "phase inversion" process (see R. F. KESTING "Synthetic polymeric membranes", page 117, edition MAC GRAW HILL 1971). It can be adapted to the case of polyquinoxalines with several modifications which take into account the fact that polyquinoxalines are not soluble in water-miscible solvents. The structure of the membranes obtained by this process is characterized by the absence of a porosity gradient inside the membrane. The interest of such process is that it enables one to obtain on one face of the membrane a layer of very low thickness (from 0.05 to a few microns), the pore dimensions of which are comprised between 50 Å and 1000 to 2000 Å. Such layer often called "skin" lies on a much thicker porous substrate (of several tens of microns) which plays the role of mechanical carrier of the "skin" while being itself very permeable to gases.

In case of the polyquinoxalines this process alone does not enable one to obtain on the "skin" side a zone having pore diameters lower than 10 Å and which in view of this would be appropriate for gas separation through the gaseous permeation mechanism. It is known that with certain polymers, when the membrane prepared by the "phase inversion" process is submitted to a thermal treatment in hot water, the dimensions of the pores in the "skin" may be strongly reduced. This is the case, for example, with membranes of cellulosic acetate which due to this treatment get high selectivity relative to the aqueous salt solutions thereby making them suitable for soaking sea water and brine waters by the "reverse osmosis" method. Such reverse osmosis membranes, already presenting the desired selectivity, can be treated by a thermal drying process so as to be uses subsequently as gaseous permeation membranes. U.S. Pat. Nos. 4,134,742 and 4,130,403 describe such membranes.

The case of polyphenylquinoxaline membranes obtained by the phase inversion process, the pore dimensions in the "skin" are too high to permit efficient gas separation. Moreover, such "skin" presents structural defects (microcracks, pores of dimensions higher than a few tens of Angstroms, and the like) incompatible with obtaining good selectivity relative to gases.

Now, the Applicants have observed that the "skin" pore dimensions can be reduced, the defects partly or totally eliminated and the membrane selectivity significantly increased by submitting it to a thermal treatment in an inert liquid (by "inert" it is meant non solvent for the polymer) relative to the membranes between 60° C. and the liquid boling point, either in air or a gas atmosphere between 50° and 150° C., or successively in a liquid and a gas atmosphere.

Another process permitting to reduce the "skin" defect influence consists of closing the orifices consecutive to these defects either by filling them up with a liquid polymer curable in situ or by covering them with a thin film of a solid polymer as was described in U.S. Pat. No. 4,230,463. To this end, it is advantageous to use polymers of low molecular mass, in particular elastomers selected from the group consisting of silicone resins, acrylic resins, styrenic resins and polybutadiene and isoprene elastomers, due to their high gas permeability and elasticity. This process however presents disadvantages which make it more limitative than the thermal treatment. In particular it modifies the chemical composition of the "skin". In as much as the elastomers used to this end possess a resistance to chemical agents and thermal stability lower than those of the polymers constituting the "skin", as is the case with the membranes according to this invention, the life span of the membrane decreases.

Moreover such treatment causes a strong decrease in the permeability of the membrane.

If the area corresponding to the defects is small as compared to the "skin" area without any defects, it is not necessary for the polymer used in eliminating the defects, to have a high intrinsic viscosity, as selectivity is given by the polymer which constitutes the "skin". However if such area is not small, as compared to that of the "skin", it is necessary that the polymer which serves in eliminating the defects should be itself selective.

Polyphenylquinoxaline membranes of asymmetric structure can be prepared according to the process described in French Pat. No. 2 392 697. A solution of the polymer is poured down by means of an applicator onto a plane glass or metal carrier so as to obtain a solution layer of uniform thickness. The carrier covered with the solution is then immersed in a liquid to permit coagulation of the polymer. Such liquid must be a non solvent for polyphenylquinoxaline and well miscible with its solvent so that an exchange may occur between the liquid and the polymer solvent. Such exchange which is shown by the solvent diffusion outside the solution and the liquid penetration thereinto causes precipitation of the polymer. The polymer solution layer which was transparent upon immersion into the liquid becomes opaque and leaves its carrier when a sufficient quantity of solvent diffuses into the outside liquid. After a variable period depending on the nature of the coagulation liquid the polymer layer becomes sufficiently solid to be separable from the coagulation liquid. Such layer constitutes the membrane having the above described structure. Its thickness depends on that of the solution layer poured down on the carrier. Instead of pouring the polyphenylquinoxaline solution directly onto a glass or metal plate it can be poured onto a fabric or unwoven mat previously spread out on the plate. In such case a membrane is obtained adhering to the fabric or the unwoven mat, and its purpose is to provide mechanical reinforcement of such membrane.

Selection of the coagulation liquid depends on the nature of the solvent of the polyphenylquinoxaline solution. Thus, in the case of m-cresol, it is interesting to use alcohols as the coagulation liquid, in particular methanol, ethanol and propanol. If the solvent used is a chlorinated hydrocarbon such as tetrachloroethane, it is preferred to take a ketone such as e.g. acetone as the coagulation liquid. A solvent and precipitant mixture may also be used as the coagulation liquid. Such a mixture often permits modification of the membrane pore dimensions.

Addition to the polyphenylquinoxaline solution of a porophorous agent extractable in the coagulation liquid such as for example certain polymers (polyvinylpyrrolidone, polyoxyethylene, and the like) or a surfactant permits to increase the membrane porosity rate.

In accordance with this invention the obtained membrane is thereafter submitted to a treatment adapted to partly or totally eliminate the surface defects and decrease the diameter of the pores in the superficial layer constituting the "skin" of such membrane until obtaining a "dense" "skin" so as to permit gas molecules to pass through the "skin" according to a dissolution and diffusion mechanism following Fick's laws. Such treatment does not reduce the structural asymmetry existing between the "skin" and the underlying layer before application of the treatment and which results in a ratio of the average pore diameter in the "skin" to that of the face opposite to the "skin", of at least 100. At most there is obtained an increase in such ratio since reduction of the average pore radius following the treatment is generally lower on the face opposite to the "skin" than on the "skin" itself. Advantageously, the treatment which may be used is a thermal one. The duration and temperature of such thermal treatment are selected experimentally depending on the gas separation rate which is to be obtained. According to a modified embodiment such a thermal treatment can be completed by depositing an elastomer onto the membrane surface followed by an additional thermal treatment in as much as one is free to increase the membrane selectivity to the detriment of its permeability.

The asymmetric structure membranes obtained according to the above process present a methane permeability as measured at 20° C. under 3 bars of $10^{-6}$ to $10^{-3}$ cm$^3$/cm$^2$.sec.cm Hg, according to the conditions of preparation used for a water vapor permeability as measured at 50° C. under a relative pressure of 0.4 to 0.5 higher than that of the methane by a factor of 10 to 1000 depending on the texture of the membranes. The permeability of such membranes to carbon monoxide as measured under the same conditions as those for methane is 1.2 to 15 times higher than the methane permeability, the multiplication factor depending on the membrane texture.

The asymmetric structure membranes of polyphenylquinoxaline of the invention can be used as flat membranes or hollow fibres. The advantage of the hollow fibre form results from the fact that the ratio of the membrane area to the volume of the module containing the membrane is much higher than that of the flat membrane.

Another process for preparing membranes of high permeability can be used when it appears to be impossible to bring the selective polymer to the form of a sufficiently asymmetric porous structure layer. This is the case for example when the "phase inversion" process poorly applies to the selective polymer. Then, the porous asymmetric structure layer is prepared from a polymer which is more adapted and there is deposited on the face containing the smallest pores a dense and homogeneous film of the selective polymer. The thickness of such film is lower than 2 microns and preferably lower than 0.5 micron. There is thus realized a composite membrane which is interesting because if possesses the qualities of each of the two polymers used for its preparation i.e. one giving both the asymmetric porous structure and the mechanical strength and the other the selectivity. Of course, and in accordance with this invention such composite membranes are submitted to the thermal treatment under the above-mentioned conditions. The following Examples which do not correspond to optimization of the preparation of the membranes are given in a non limitative manner to illustrate the utilization of the polyquinoxalines as the basic material for preparation of membranes for the hydratation, purification and gaseous mixture separation.

EXAMPLE 1

A polyphenylquinoxaline is used having the following chemical structure:

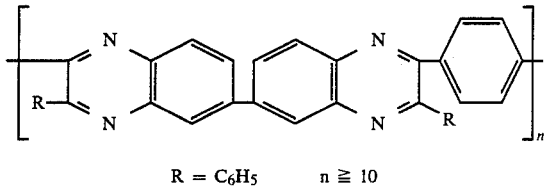

R = C$_6$H$_5$   n ≧ 10

By means of an applicator set to 0.25 mm a solution of 11% by weight of polyphenylquinoxaline in metacresol is spread out on a glass plate which is immediately immersed into an ethanol bath at 25° C. for 24 hours and then into a dimethylformamide (DMF) bath for 24 hours, and finally, into a bath of distillled water for 4 hours. During immersion in ethanol the latter penetrates into the polymer solution and the metacresol partly diffuses outwardly of the polymer into the ethanol bath. The polymer solidifies little by little and comes off in the form of an opaque membrane from its glass plate. Transfer of the membrane into a DMF bath prevents any sudden shrinking of the membrane pores. After water washing the membrane is dried in a dry air draft at the ambient temperature. The methane permeability of the so obtained membrane is higher than 5.10$^{-4}$ cm$^3$/cm$^2$.sec.cm Hg but this membrane is not selective either for CO$_2$ or for water vapor.

EXAMPLE 2

The process is effected as in Example 1, but after water washing, the membrane is submitted to a thermal air treatment at 50° C. for several hours. It has a thickness of 90 microns and has an asymmetric porous structure consisting of a "skin", of a thickness of about 3 microns supported by a porous substrate. The average pore diameter in the "skin" is comprised between 0.005 and 0.02 micron. The porous substrate pores are in form of glove fingers oriented perpendicularly to both faces of the membrane and communicating with the face opposite to the "skin" through openings of a diameter of 10 to 20 microns.

Permeability of such membrane to different gases expressed in $cm^3/cm^2.sec.cm$ Hg is shown in the Table 3 hereunder:

TABLE 3

Permeability P and separation factor
Asymmetric membrane of a thickness of 90 microns $$P \text{ expressed in } \frac{cm^3}{cm^2 \cdot sec \cdot cm\ Hg}$$

Measurement pressure: 3 bars - Measurement temperature: 20° C.

| $P \cdot 10^4$ | | | | | Separation factor | |
|---|---|---|---|---|---|---|
| $O_2$ | $CH_4$ | $CO_2$ | He | $H_2O$* | $H_2O/CH_4$ | $CO_2/CH_4$ |
| 2 | 2.8 | 1.1 | 5.1 | 35 | 12.5 | 0.4 |

*measured at 50° C. for a relative pressure of 0.44.

It is observed that $CH_4$ permeability is higher than $CO_2$ permeability contrary to what was observed on dense films (see Table 1). This proves that there are defects in the "skin" texture and that the "skin" pores present excessive dimensions.

EXAMPLE 3

The same solution of polyphenylquinoxaline is used as in Example 1, to which there is added, to obtain higher porosity asymmetry in the membrane, 40% of surfactant (Triton X 100) with respect to the weight of the polyphenylquinoxaline.

It is proceeded as in Example 1 but the immersion times in the coagulation bath, which are one hour in ethanol, 5 hours in DMF and 5 days in distilled water, are modified.

After water washing the membrane is treated for 2 hours at 90° C. Its thickness is 100 microns. The thickness of its "skin" is on the order of 12 microns, its permeability to different gases is shown in Table 4.

TABLE 4

Permeability P and separation factor of the membrane of Example 3.
Membrane of a thickness of 100 microns and an asymmetric structure.

$$P \text{ expressed in } \frac{cm^3}{cm^2 \cdot sec \cdot cm\ Hg}$$

Measurement pressure: 3 bars, measurement temperature: 20° C.

| $P \cdot 10^5$ | | | | | Separation factor | |
|---|---|---|---|---|---|---|
| $O_2$ | $CH_4$ | $CO_2$ | He | $H_2O$* | $H_2O/CH_4$ | $CO_2/CH_4$ |
| 2.7 | 3.8 | 4.4 | 8.8 | 330 | 87 | 1.16 |

*as measured at 50° C. for a relative pressure of 0.43.

The more extensive thermal treatment therefore permitted to improve selectivity.

EXAMPLE 4

The same solution as in Example 3 is used and it is spread out by means of an applicator onto a glass plate which is quickly immersed into an ethanol bath at 25° C. for 10 minutes. The membrane is thereafter immersed into distilled water for 6 days. After water washing at 80° C., the membrane is treated for 4 hours at 90° C. Its thickness is 100 microns. Its permeability to different gases is shown in Table 5.

A portion of such membrane (of an area of 20 $cm^2$) is thereafter placed on a filtration carrier and there is filtered therethrough 15 $cm^3$ of a solution with 3.5% of polydimethylsiloxane in hexane under a pressure of 4 bars. The polydimethylsiloxane is a commercial product from DOW CORNING (Sylgard). It is used in the presence of 10% of a reticulation catalyst.

Following such filtration the membrane is submitted to a thermal treatment for one hour at 60° C. and one hour at 120° C. The permeability to different gases of the so treated membrane is shown in Table 6.

TABLE 5

Permeability P and separation factor of the membrane of Example 4.
Membrane of a thickness of 100 microns of asymmetric structure.

$$P \text{ expressed in } \frac{cm^3}{cm^2 \cdot sec \cdot cm\ Hg}$$

Measurement pressure: 3 bars, measurement temperature: 20° C.

| $P \cdot 10^5$ | | | | | Separation factor | |
|---|---|---|---|---|---|---|
| $O_2$ | $CH_4$ | $CO_2$ | He | $H_2O$* | $H_2O/CH_4$ | $CO_2/CH_4$ |
| 1.7 | 2.7 | 3.5 | 3.7 | 250 | 92 | 1.3 |

*as measured at 50° C. for a relative pressure of 0.45.

TABLE 6

Permeability P and separation factor of the membrane of Example 4 treated by polydimethylsiloxane.
Membrane thickness: 100 microns.

$$P \text{ expressed in } \frac{cm^3}{cm^2 \cdot sec \cdot cm\ Hg}$$

| $P \cdot 10^5$ | | | | | Separation factor | |
|---|---|---|---|---|---|---|
| $O_2$ | $CH_4$ | $CO_2$ | He | $H_2O$* | $H_2O/CH_4$ | $CO_2/CH_4$ |
| 0.57 | 0.30 | 2.8 | 2.6 | 233 | 776 | 9.3 |

*as measured at 50° C. for a relative pressure of 0.48.

It is observed that such treatment permitted to eliminate the defects in the membrane "skin" and to multiply its separation factor $H_2O/CH_4$ by 8 and its separation factor $CO_2/CH_4$ by 7 as compared to the untreated membrane.

EXAMPLE 5

A composite membrane is prepared from a microporus carrier of acrylic polymer of the type IRIS 4038 (Rhone Poulenc). Such carrier presents a methane permeability of 0.14 $cm^3/cm^2.sec.cm$ Hg as measured under pressure differential and does not present any methane/water selectivity.

The shiny face of such carrier (face having the finest porosity) is contacted for 1 to 2 minutes with a solution at 2% by weight of polyphenylquinoxaline in 1,1,2,2-tetrachloroethane and the carrier is thereafter dried for about 10 minutes at ambient temperature and then it is treated in air for 20 minutes at 60° C.

Permeability of such membrane to different gases is shown in Table 7.

TABLE 7

Permeability P and separation factor of a composite membrane.

$$P \text{ expressed in } \frac{cm^3}{cm^2 \cdot sec \cdot cm\ Hg}$$

Measurement pressure: 3 bars, measurement temperature: 20° C.

TABLE 7-continued

| | P · 10⁵ | | | | Separation factor | |
|---|---|---|---|---|---|---|
| O₂ | CH₄ | CO₂ | He | H₂O* | H₂O/CH₄ | CO₂/CH₄ |
| 0.6 | 0.9 | 0.6 | 1.3 | 25 | 27 | 0.67 |

*as measured at 50° C. for a relative pressure of 0.40.

A second microporous carrier identical to the preceding one is used and its shiny face is contacted for one minute with a solution of 5% by weight of polyphenylquinoxaline in 1,1,2,2-tetrachloroethane. The membrane is submitted to a thermal treatment under the same conditions as above. Its gas permeability is shown in Table 8.

TABLE 8

Permeability P and separation factor of a composite membrane.

$$P \text{ expressed in } \frac{cm^3}{cm^2 \cdot sec \cdot cm.Hg}$$

Measurement pressure: 3 bars, measurement temperature: 20° C.

| | P · 10⁵ | | | | Separation factor | |
|---|---|---|---|---|---|---|
| O₂ | CH₄ | CO₂ | He | H₂O* | H₂O/CH₄ | CO₂/CH₄ |
| 0.12 | 0.20 | 0.14 | 1.21 | 8.0 | 40 | 0.7 |

*as measured at 50° C. for a relative pressure of 0.50.

From the above Examples it results that the membranes according to this invention are undoubtedly interesting for the fractionation of the gaseous mixtures and in particular dehydration and deacidification of gases, in particular gaseous hydrocarbons.

It will be understood that this invention was only described in a purely explanatory and not at all limitative manner and that any useful modifications can be made thereto without however departing from its scope.

We claim:

1. An asymmetric gaseous permeation membrane, also applicable to fractionation of a gaseous mixture and in particular dehydration and deacidification of gases, in particular gaseous hydrocarbons, which is obtained from polymers of the polyquinoxaline family presenting the unit:

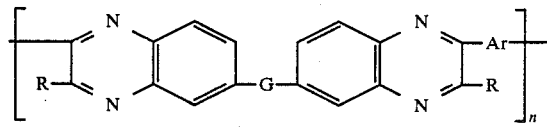

with: n ≧ 10 and

R=H or phenyl radical,
G=carbon-carbon bond, or —O—, —S—, —SO₂—, —CO—

Ar = 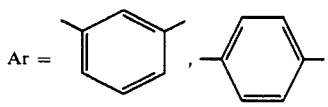

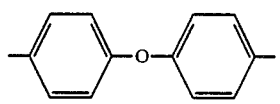

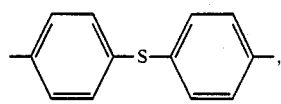

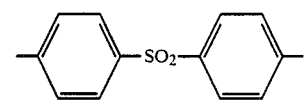

presenting a dense "skin" of low thickness ranging from 0.05 to a few microns substantially without defects and any existing pores having a diameter less than 10 Å in order to permit gas molecules to pass through by a dissolution-diffusion mechanism, and having a permeability to methane as measured at 20° C. under 3 bars of $10^{-6}$ to $10^{-3}$ cm³/cm².sec.cm Hg, together with a separation on factor H₂O/CH₄ under the same conditions of at least 10.

2. An asymmetric gaseous permeation membrane according to claim 1, wherein said skin comprises a very thin layer of an elastomer, preferably curable in situ, selected from the silicone resins, the acrylic resins, the styrenic resins and the butadiene and isoprene elastomers resulting from contacting said "skin" of the membrane with a solvent solution of said elastomer, followed by evaporation of said solvent.

3. The membrane of claim 2 wherein said membrane is subjected to a thermal treatment for a period of several minutes to several hours, said thermal treatment being effected in an inert liquid at a temperature between 50° C. and the boiling point of said liquid, or in a gas at a temperature of from 50° C. to 150° C.

4. An asymmetric gaseous permeation membrane according to claim 1, wherein the polymer is polyphenylquinoxaline made of the following unit:

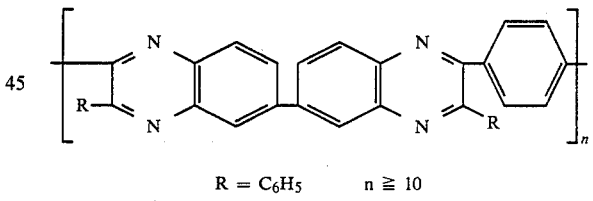

R = C₆H₅    n ≧ 10

5. As asymmetric membrane according to claim 1 made by subjecting said membrane to thermal treatment for a period of from several minutes to several hours, said thermal treatment being effected in an inert liquid at a temperature between 50° C. and the boiling point of said liquid or in a gas at a temperature of from 50° C. to 150° C.

6. An asymmetric gaseous permeation composite membrane comprising a microporous membrane supporting a think "skin" of polyquinoxaline of a thickness lower than 2 microns having a membrane permeability as measured at 20° C. under 3 bars of $10^{-6}$ to $10^{-3}$ cm³/cm².sec.cm Hg, together with a separation factor for H₂O/CH₄ under the same conditions of at least 10.

7. An asymmetric composite gaseous permeation membrane according to claim 6, wherein the polymer is the polyphenylquinoxaline having the following unit:

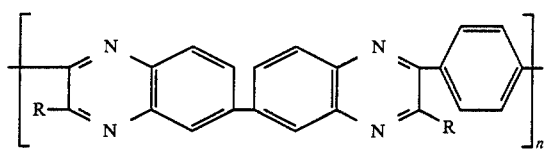
R = C₆H₅  n ≧ 10
8. The membrane of claim 6 wherein said membrane is subjected to a thermal treatment for a period of several minutes to several hours, said thermal treatment being effected in an inert liquid at a temperature of between 50° C. and the boiling point of said liquid, or in a gas at a temperature of from 50° C. to 150° C.
* * * * *